Figure 1:
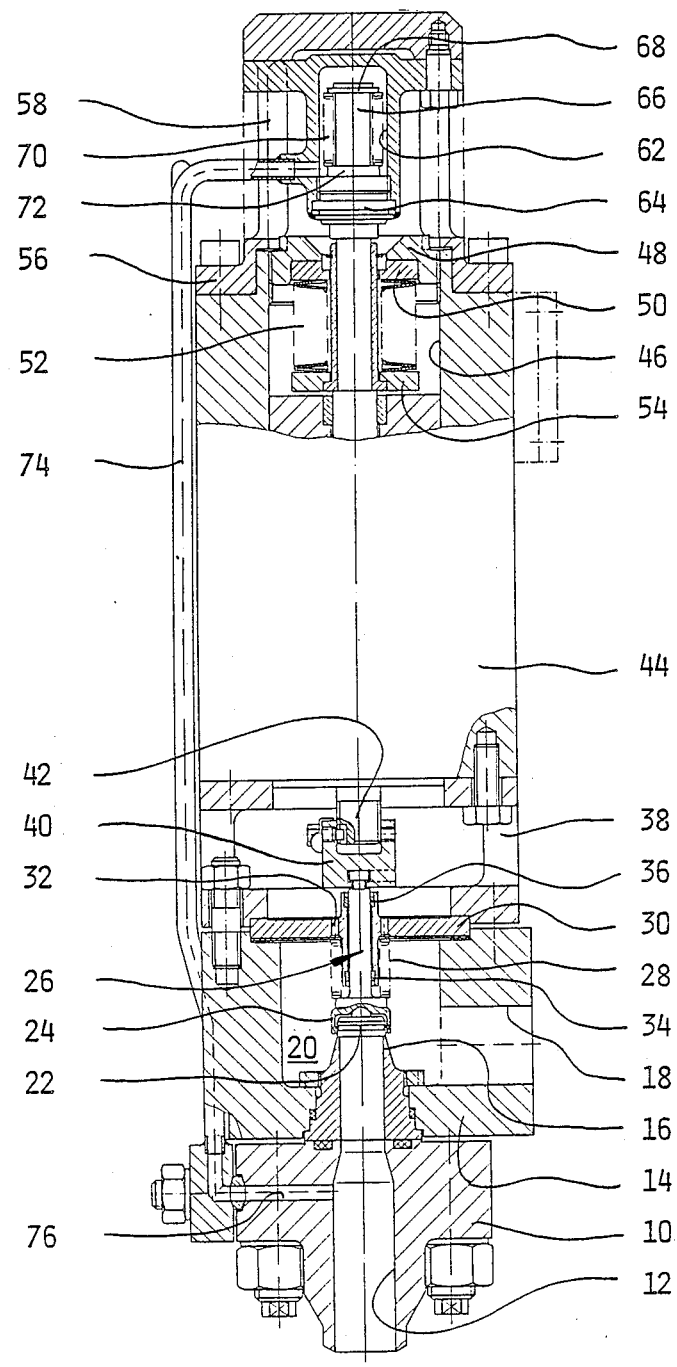

United States Patent [19]

Häfele et al.

[11] Patent Number: 4,875,659
[45] Date of Patent: Oct. 24, 1989

[54] SERVO-VALVE

[75] Inventors: Carl H. Häfele,. Werner-von-Siemens-Strasse, 4052 Korschenbroich 1; Manfred Weyand, Korschenbroich, both of Fed. Rep. of Germany

[73] Assignees: Sempell Aktiengesellschaft; Carl Heinz Häfele, both of Fed. Rep. of Germany

[21] Appl. No.: 243,847

[22] Filed: Sep. 13, 1988

[30] Foreign Application Priority Data

Sep. 20, 1987 [DE] Fed. Rep. of Germany ....... 3731664

[51] Int. Cl.[4] .............................................. F16K 39/02
[52] U.S. Cl. ................................... 251/282; 251/335.2
[58] Field of Search ........................ 257/282, 335.3, 87

[56] References Cited

U.S. PATENT DOCUMENTS

| 907,771 | 12/1908 | Fulton | 251/282 |
|---|---|---|---|
| 1,153,681 | 9/1915 | Fulton | 251/282 X |
| 3,414,231 | 12/1968 | Kreuter | 251/282 X |
| 3,613,733 | 10/1971 | Machek | 251/282 X |
| 3,627,257 | 12/1971 | Stampfli | 251/282 X |
| 3,800,832 | 4/1974 | Umphenour et al. | 251/282 X |
| 3,805,835 | 4/1974 | Jansen | 257/282 |
| 3,858,607 | 1/1975 | Baker | 251/282 |
| 4,029,293 | 6/1977 | Meysenburg | 251/282 |
| 4,252,296 | 2/1981 | Berg | 251/282 X |
| 4,529,164 | 7/1985 | Igashira et al. | 251/282 X |

Primary Examiner—John Rivell
Attorney, Agent, or Firm—Fred Philpitt

[57] ABSTRACT

In a servo-valve, a metal bellows (70) is fitted onto an end section (66) of valve stem (26,42) lying at a distance from the seal (22), one end of said metal bellows (70) being supported rigidly in housing (72), while its other end engages the end of the stem. The metal bellows (70) are located in a pressure chamber (62) which is connected by a condensate coil (74) to the valve intake (12), whereby the cross-sectional area of the metal bellows (70) is made to match the area of the passageway of the valve seat (16). In this way, it is possible to achieve an overall compensation of the forces at the seal (22) or a desired additional load in the closed or open direction.

8 Claims, 6 Drawing Sheets

SERVO-VALVE

The invention relates to a servo-valve according to the characterising clause of claim 1.

With servo-valves of this kind, it is usual for the servomotor to be designed in such a way that it can assume two stable positions. As a rule, one of the positions is set by a prestressed spring, whilst the other position is set by the excitation of an electromagnet or by the pressure supply of a fluid servomotor.

Frequently, the cases of application encountered are ones in which a flow medium under variable pressure has to be passed through the servo-valve. With the known servo-valves, the effect of the varying pressure load on the area of the seal lying within the valve seat leads not only to a variability in the efficiency of the sealing force, but also to variable actuating forces. This means that the servomotor has to be adjusted to the maximum pressure load to be expected on the seal.

The present invention is intended, therefore, to introduce a further development to the servo-valve according to the characterising clause of claim 1, such that the effects of the pressure present at the intake side on the sealing force and the actuating force of the servo-valve are at least partially, and preferably wholly, removed.

According to the invention, this task is solved by means of a servo-valve according to claim 1.

In the case of the servo-valve according to the invention, the seal is subjected by means of the additionally provided compensating motor to an additional force, which is opposed to the force produced by the pressure supply to the area of the seal lying within the valve seat. In terms of magnitude, the additional force is guided by the force produced by the pressure supply to the seal, whereby fairly small deviations from equality upwards can be advantageous in the case where a sealing force on the valve increasing with rising intake pressure is desired, whilst a deviation from equality downwards can be provided in those cases where it is desired to achieve a more rapid opening operation with increasing pressure on the intake side.

Advantageous further developments of the invention are indicated in the sub-claims.

The further development of the invention according to claim 2 is advantageous, because there are no additional cylinder or piston surfaces for the compensating motor that would have to be aligned on the axis of the valve stem.

With a servo-valve according to claim 3, the metal bellows, which form the compensating motor, lie at the extreme end of the servo-valve and can thus easily be replaced if need be. The spacial arrangement indicated in claim 3 also facilitates the retrofitting of servo-valves already in use.

In the case of a servo-valve according to claim 4, the metal bellows forming the compensating motor are subjected internally to the pressure existing on the intake side, which makes it possible to use particularly thin and therefore inexpensive bellows.

The further development of the invention according to claim 6 is such that pressure changes in the interior of the metal bellows in the vicinity of one of the end positions of the valve take place only slowly, whereby the throttling due to the baffle plate diminishes with increasing displacement of the valve stem out of the aforementioned end position.

The further development of the invention according to claim 7 is such that the metal bellows forming the compensasating motor can perform simultaneously the function of a hydraulically actuated servomotor acting on the valve stem.

In the case of a servo-valve according to claim 8, there is normally a non-operating auxiliary compensating motor which, in the even of a failure of the metal bellows, automatically takes their place and—apart from somewhat worse sealing properties—covers up the failure of the metal bellows.

The further development of the invention according to claim 9 is such that the working area of the compensating motor and the steam pipe leading to it are kept free, i.e. are filled with liquid, so that pressure changes at the valve intake are passed on rapidly and undiminished to the working area of the compensating motor.

The invention is described in greater detail below with the aid of examples of embodiment and by reference to the drawing.

Figure 2:
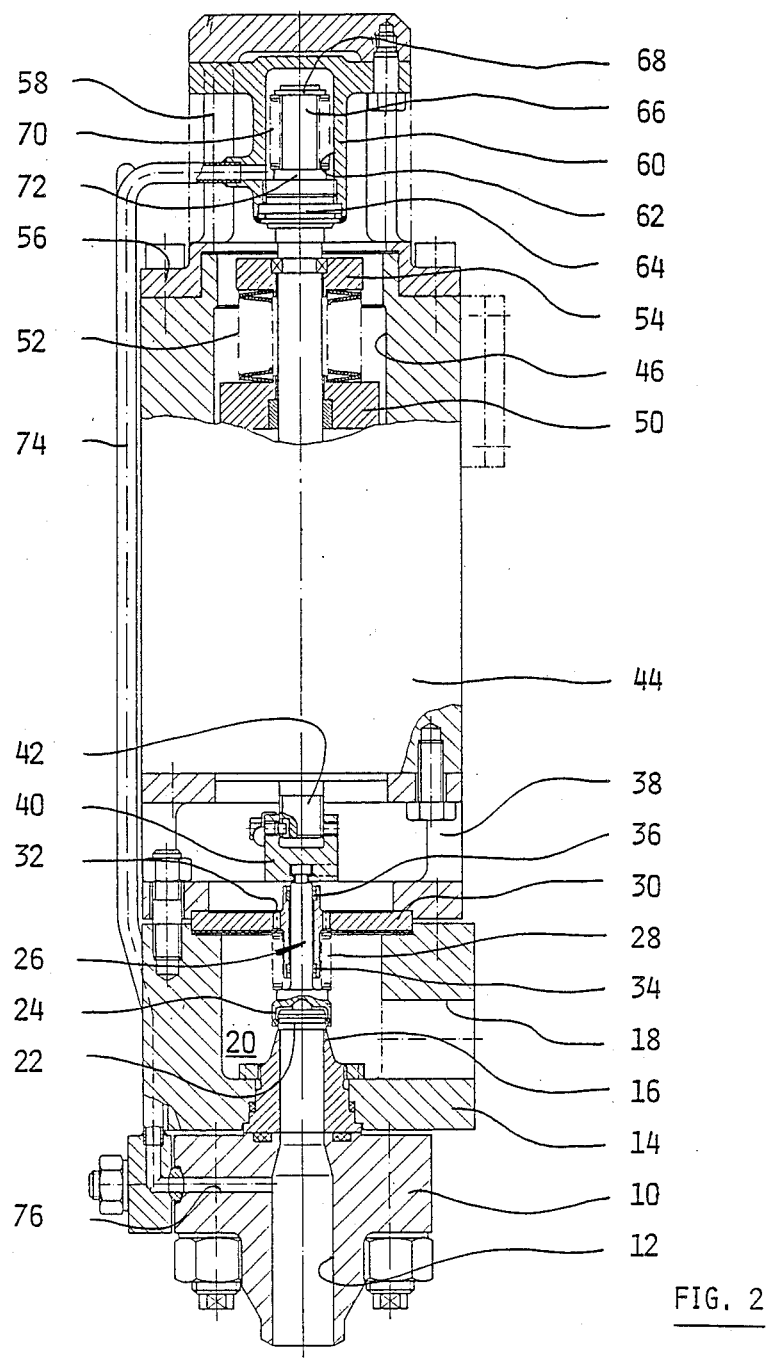
Figure 3:
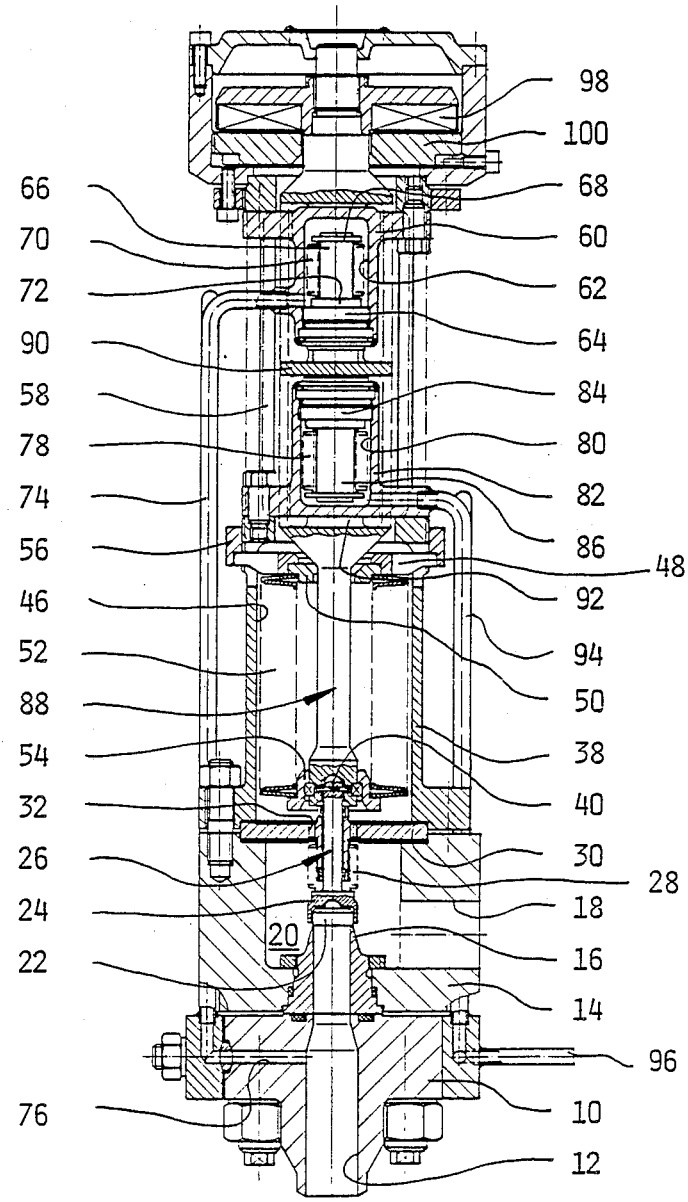
Figure 4:
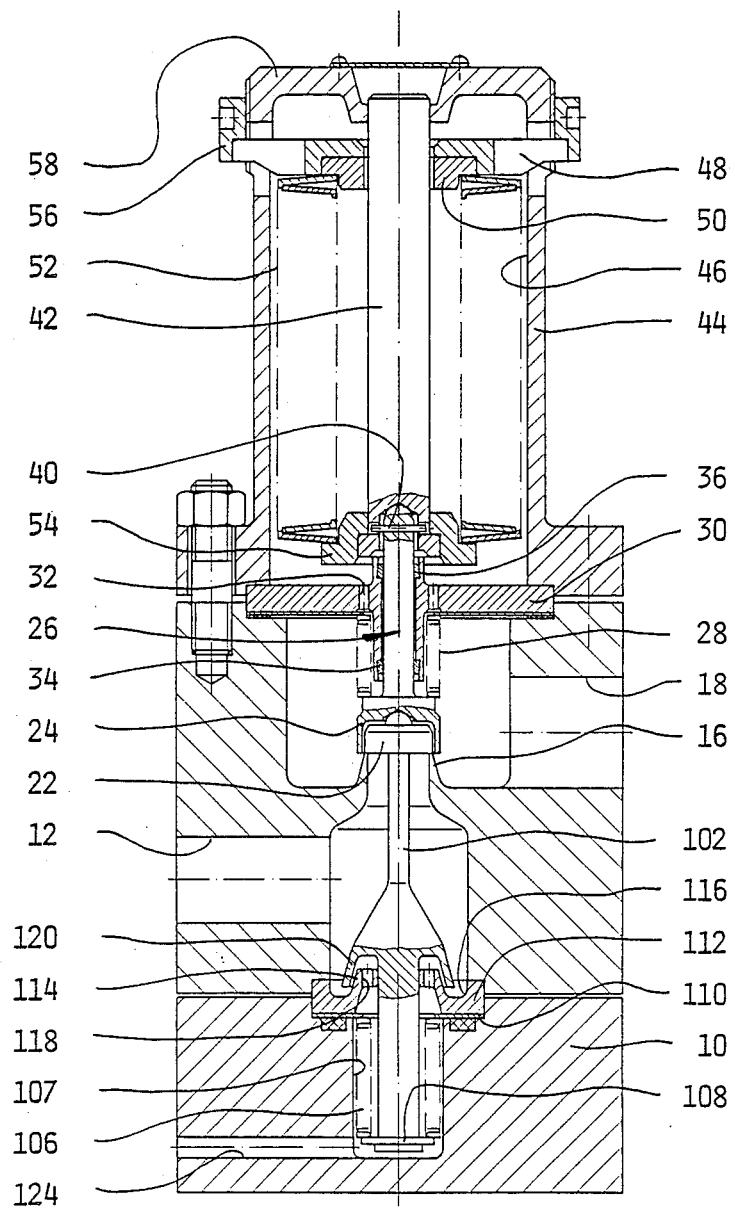
Figure 5:
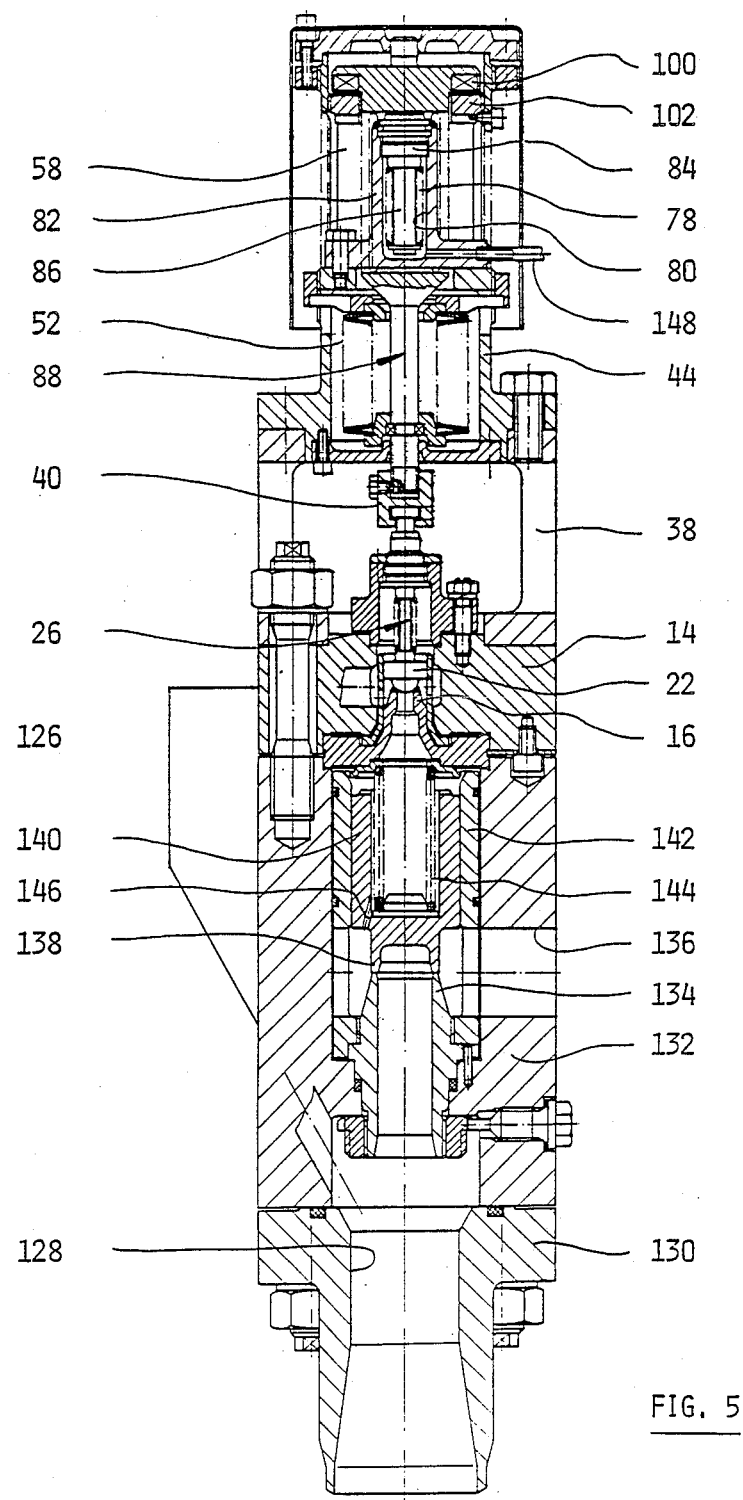
Figure 6:
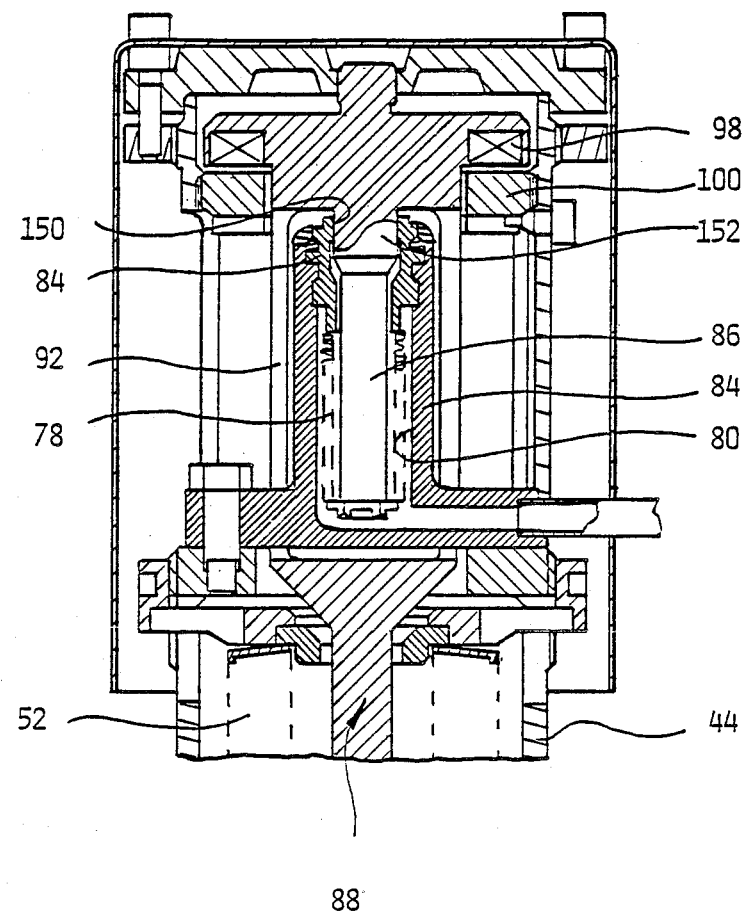

In these drawings:

FIG. 1: shows an axial cross-section through a normally closed working-current solenoid valve;

FIG. 2: an axial cross-section through a normally closed quiescent current solenoid valve;

FIG. 3: an axial cross-section through a hydraulically actuated servo-valve;

FIG. 4: an axial cross-section through a further hydraulically actuated servo-valve;

FIG. 5: an axial cross-section through a hydraulically actuated pilot valve with a mounted main valve; and FIG. 6: an enlarged cross-section through the upper end section of the pilot valve shown in FIG. 5.

The servo-valve shown in FIG. 1 has a lower cover 10 in which an intake port 12 is provided. A lower housing part 14 carries in its bottom wall a valve seat 16, which is connected to the intake port 12. The peripheral wall of the housing part 14 is provided with an outlet port 18, which is connected to an annular outlet space 20 surrounding the valve seat 16.

Working in cooperation with the valve seat 16 there is a seal 22 which is held, in a slightly tiltable manner, in a lower head section 24 of a valve stem, designated as a whole by 26.

The valve stem 26 is sealed by metal sealing bellows 28 against an intermediate plate 30, which closes off the upper side of the outlet space 20. The intermediate plate 30 has in its central area a number of drill holes 32, which are connected to the interior of the sealing bellows 28.

The valve stem 26 is guided and sealed in the intermediate plate 30 by means of sliding seal packings 34, 36.

Fitted onto the lower housing part 14 there is a lanterned-shaped middle housing part 38, through the side openings of which a coupling part 40 is accessible, by means of which the valve stem 26 is connected to the anchor stem 42. The latter represents the output part of a solenoid not shown in detail, the housing 44 of which is mounted on the middle housing parat 38.

The upper section of the magnet housing 44 contains a spring pocket 46 which is closed off by a pocket cover 48. The underside of the pocket cover 48 supports, with the insertion of a seating ring 50, the upper end of a cup spring assembly 52, the lower end of which engages a spring seat 54 connected rigidly to the anchor stem 42. In this way, the seal 22 is preloaded into the closed position and can be raised from the valve seat 16 by exciting the solenoid.

The pocket cover 48 is fixed in position by means of othe lower flange 56 of an upper cover 58 of the valve housing, which is again lanternshaped. A motor housing 60 is screwed down on the upper wall of the cover 58, a cylindrical presure chamber 62 open at the bottom being provided in the said motor housing. Into the lower end of the pressure chamber 62 there is inserted rigidly and leaktight a cylindrical end piece 64, which has a central guide hole through which an end section 66 of the anchor stem 42 projects. This end section 66 has at its free end an integral flanage 68, to which the upper end of the metal bellows 70 is attached in a manner leaktight against the flow medium. The lower end of the metal bellows 70 is attached leaktight to a shoulder 72 of the end piece 64.

The pressure chamber 62 is connected by means of a condensation coil 74, which extends in a number of turns along the lateral surface of the valve housing, to a tap duct 76 which is formed in the lower cover 10 of the valve housing and issues from the intake port 12. In this way, the pressure chamber 62 is supplied via a liquid column with the pressure prevailing in the intake port 12.

In the example of embodiment represented, the diameter of the metal bellows 70 is of the same size as the diameter of the circular free edge of the valve seat 16, so that the areas of the seal 22 and the metal bellows 70 supplied with the pressure in the intake port 12 are of equala magnitude. Furthermore, since these areas point in opposite directions, the seal 22 is not subjected to any overall force, which would be dependent on the pressure prevailing in the intake port 12. Independently of this pressure, the closing force of the valve is preset by the strength of the spring cup assembly 52; the opening behavior of the valve is preset, again independently of the prevailing pressure, by the operating action of the solenoid (at least to a zero approximation, if the secondary, pressure-dependent flow effects at the seal 22 are neglected, which do not play a role until the seal is raised from the valve seat).

The example of embodiment shown in FIG. 2 is largely the same as that in FIG. 1, with the sole difference that the rigid seating ring 50 is now arranged under the cup spring assembly 52, whilst the mobile spring seat 54 connected to the anchor stem 42 is the spring seat lying above. The seal 22 is thus preloaded into the open position by means ofo the cup spring assembly; in order to adjust the normally closed position of the valve, a quiescent current must be supplied through the solenoid.

The servo-valve showon in FIG. 3 also has valve parts which correspond functionally to valve parts already described above, provided again with the same reference numbers, and these will not be discussed again in detail.

In order to control the valve, a second hydraulically actuated motor is provided which comprises a second metal bellows 78. The latter is located in a further pressure chamber 80, which is formed in a second motor housing 82. The motor housing 82 is connected to the lower end wall of the lantern-shaped housing part 58.

The pressure chamber 80 is closed off by an end piece 84 lying above. A further rod-shaped end section 86 of a drive spidle designated overall by 88 is passed with a snug fit through this end piece 84. The two end section s66 and 86 are both carried by a bridge 90 which is rigidly welded to cage section 92 of the drive spindle 88. The cage section 92 of the drive spindle 88 surrounds the motor housiings 60 and 82 with a radial clearance and allows at the same time the feeding of the pressure medium to the two pressure chambers 62 and 80.through the condensate coil 74 and through the second condensate coil 94, which is connected to a control pressure source via a line 96 and a servo-valve not shown in detail.

The upper end of the ddrive spindle 88 carries a permanent magnet 98 which cooperates with a rigid anchor plate 100. In this way, a preload force in the closed direction is obtained which diminishes sharly with the stroke of the seal 22, as is known per se from full-stroke safety valves.

With the servo-valve shown in FIG. 3, the cross-sectional area of the metal bellows 70 is also adapted to the ring area fixed by the valve seat 16, so that a compensation of the pressure supply on the seal 22 is obtained.

For geometrical reasons, in the case of the example of embodiment shown in FIG. 3, the cross-sectional area of the second metal bellows 78 is selected only slightly larger than the cross-sectional area of the metal bellows 70, since both motor housings 60 and 82 are to be accommodated in the interior of the cage section 92 of the drive spindle 88.

Apart from the fact that, in the case of the servo-valve according to FIG. 3, the displacement of the seal 22 between its two end positions takes place due to the pressure supply from the metal bellows 78, a similar mode of operation exists, as in the case of the examples of embodiment described above.

FIG. 4 shows a directly controlled hydraulically actuated servo-valve in whichc a single metal bellows caters both for the force compensation at the seal as well as for the operating motion. Valve parts already described above are again not described in detail.

A stem 102 hanging downwards is integrally moulded on the seal 22, the end section 104 of said stem being pased through the interior of the metal bellows 106. The end section 104 again has a flange 108, to which the driving end of the metal bellows 106, now situated at the bottom, is attached leaktight, whilst its upper end is attached leaktight to a gasket 110 arranged rigidly in the housing. The latter, together with a baffle part 112, is clamped between the lower cover 10 and the housing part 14.

The baffle part 112 has a middle conical section 114, which is surrounded by a circular groove 116. The conical section 114 has a number of holes 118, which are connected via the gasket 110 to the interior of the metal bellows 106.

Integrally moulded on the stem 102 is a conical baffle screen 120 which can overlap, at a smalal distance apart, the conical section 114 of the baffle part 112. The two baffle parts 112 and 120 thus form a variable throttle point independent of the stroke of the seal 22, the interior of the metal bellows 106 being connected to the intake port 12 by said baffle point.

The metal bellows 106 lie in a pressure chamber 107 which is formed in the lower cover 10. This pressure chamber is connected to the control duct 124 which can be connected to a control pressure source via a control valve not shown in detail.

The cross-sectional area of the metal bellows 106 is again made to match the circular area defined by the valve seat 16, so that the seat 22, when the valve is closed, again does not experience any net force dependent on the pressure in the intake port; the closing force ofo the valve is preset by the cup spring assembly 52. If the control duct 124 is supplied with pressure, the force of the cup spring assembly 52 can be overcome, and the seal 22 is raised from the valve seat 16.

A valve, similar to that shown in FIG. 3, can also be used as a pilot valve, as in the example of embodiment shown in FIG. 5.

In the case of the pilot valve shown there, the outlet port 12 of the pilot valve is connected via a line 126 to the outlet port 128 of the main valve. The main valve has a lower cover 130 restricting this port as well as a main housing part 132 in which a main valve seat 134 is provided. The latter leads to an intke port 136.

A main valve body 138 cooperating with the main valve seat 134 is integrally moulded to the lower end of an operating piston 140 which runs in a box 142. In the interior of the operating piston 140 there is a helical spring 144, by means of which the main valve body 138 is preloaded in the closed direction. The rear side of the operating piston 140 is connected via a drill hole 146 to the intake port 136.

The metal bellows 70 of the pilot valve are connected to a control duct 148, which is connected to a control pressure source again by a control valve which is not shown. This control pressure source can be the pressure present at the intake of the main valve.

The pressure supply from the pressure chamber 80 surrounding the metal bellows 78 allows the pilot valve to be opened against the force of the cup spring assembly 52, as a result of which a connection is then created between the rear side of the operating piston 140 and the outlet port 128 of the main valve. If, on the other hand, the pressure chamber 80 is cut off from the pressure supply source, the seal 22 is pushed by the cup spring assembly 52 against the valve seat 16 and the rear side of the operating piston 140 is replenished via the hole 146 from the intake port 136 of the main valve.

FIG. 6 shows details of the mechanical connection between the drive spindle 88 of the pilot valve and the metal bellows 78.

The end piece 84 of the motor housing 82 has a guide hole 150 with an enlarged diameter, which at the same time represents a cylinder bearing surface for a piston section 152 of the end section 86 of the drive spindle 88. The rest of the end section 86 lying below the piston section 152 has a reduced diameter and runs through the end piece 84 as well as the metal bellows 78 with a radial clearance. The lower end of the end section 86 is attached leaktight to the lower end of the metal bellows 78.

As can be seen from the drawing, the cross-sectional area of the piston section 152 corresponds to the effective cross-sectional area of the metal bellows 78, so that the piston section 152, in the event of the metal bellows 78 rupturing or becoming untight, is supplied with the pressure in the pressure chamber 80 and exerts on the drive spindle 88, and thus on the seal 22, a force directed upwardly in the drawing of equal magnitude to that of the metal bellows 78. Even in the event of the metal bellows 78 rupturing, therefore, the functioning of the valve is guaranteed.

Such an operation under emergency conditions can similarly be provided with the valves described above by reference to FIGS. 1 to 4.

We claim:

1. A servo-valve for use in steam systems with a housing in which a valve seat is formed between an intake and an outlet, with a seal supported by a valve steam and cooperating with the valve seat, and with a servo-motor acting on the valve stem, wherein a compensating motor is connected to an end section of the valve stem lying at a distance from the seal, the working space of said compensating motor being connected to the valve intake and its active pressure-loaded area being selected, in relation to the active area of the seal defined by the valve seat, in such a way that the force produced by the compensating motor is opposed to the existing force exerted on the seal by the low medium, and is in terms of magnitude preferably equal to or only slightly smaller or greater than the latter force, and wherein the working space of the compensating motor is connected to the valve intake by a condensate tube.

2. A servo-valve according to claim 1, wherein the condensate tube is formed as a coil.

3. A servo-valve according to claim 1 wherein the compensating motor has a metal bellows (70; 78; 106), one end of which is supported rigidly in a housing and the other endn of which engages the valve stem (26,42; 26,88; 26,102).

4. A servo-valve according to claim 3 wherein the metal bellows (70; 78) are supported by a section (66; 86) of the valve stem (26, 42; 26, 88) which lies at the end position in the open direction and is arranged in a pressure chamber (62; 82), which is connected to the valve inlet (12).

5. A servo-valve according to claim 3 wherein the metal bellows (106) are supported by a section (102) of the valve stem (26, 102) which lies at the end position in the closed direcion and the interior of the metal bellows (106) is connected to the valve intake (12).

6. A servo-valve according to claim 5 whereini the interior space of the bellows (106) is connected by a bafle plate (112, 120) to the valve intake (12).

7. A servo-plate according to claim 6 wherein the baffle plate has a mobile conical baffle body (120) supported by the valve stem (26, 102) and a rigid conical baffle body (112) which engages with the latter.

8. A servo-valve according to claim 4 wherein the rigid end of the metal bellows is formed by an end part (84) fixed rigid in a housing, in which end part a cylinder bore (150) is formed, which has the same diameter as the metal bellows and which accommodates, with a snug fit, a piston section (152) of valve stem (26, 88) which for its part has a stem end section (86), which is passed through the interior of the externally loaded metal bellows (78) to the mobile driving end of the metal bellows (78) and is connected to the latter.

* * * * *